United States Patent [19]

Givens et al.

[11] Patent Number: 5,724,496
[45] Date of Patent: Mar. 3, 1998

[54] METHOD FOR AUTONOMOUS DETERMINATION OF TIE POINTS IN IMAGERY

[75] Inventors: Fenton Lynwood Givens, Dallas; Ronald Lloyd Bowden, Parker, both of Tex.

[73] Assignee: E-Systems, Inc., Dallas, Tex.

[21] Appl. No.: 739,789

[22] Filed: Oct. 30, 1996

Related U.S. Application Data

[63] Continuation of Ser. No. 478,972, Jun. 7, 1995, Pat. No. 5,577,181.
[51] Int. Cl.$^6$ .................................................. G06F 15/00
[52] U.S. Cl. ............................................................. 395/140
[58] Field of Search .................................... 395/140, 135; 345/113, 114

[56] References Cited

U.S. PATENT DOCUMENTS

| | | | |
|---|---|---|---|
| 4,972,359 | 11/1990 | Silver et al. | 364/728.05 |
| 5,047,780 | 9/1991 | Dijkstra | 342/145 |
| 5,459,819 | 10/1995 | Watkins et al. | 395/117 |
| 5,577,181 | 11/1996 | Givens et al. | 395/135 |

*Primary Examiner*—Phu K. Nguyen
*Attorney, Agent, or Firm*—Harold E. Meier

[57] ABSTRACT

A method for selecting tie point locations within a series of overlapping images. Initially the series of images are ordered to maximize the potential for successful phase correlations between adjacent images. Adjacent pairs in the ordered images are then phase correlated to determine the translational offsets between adjacent pairs. The overlapping regions in adjacent pairs are assessed for normalized cross correlation and initial candidate tie points are selected within the regions at a reduced resolution. The initially selected tie points are then phase correlated at full resolution and any surviving candidate tie point locations are further refined to sub-pixel accuracy.

6 Claims, 6 Drawing Sheets

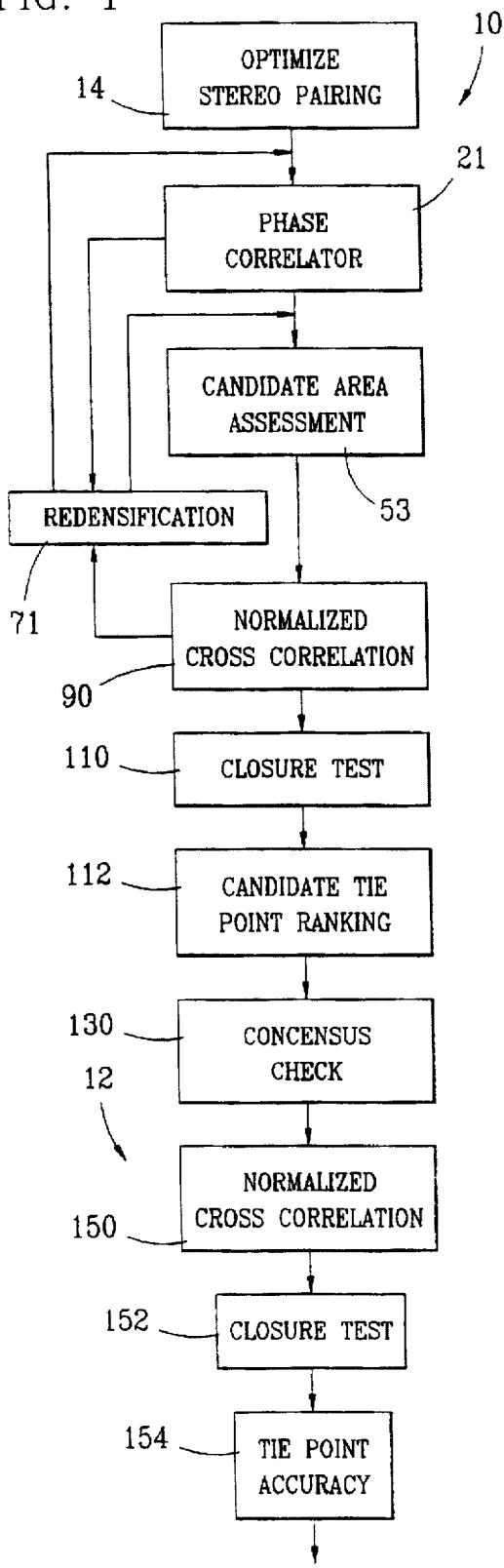
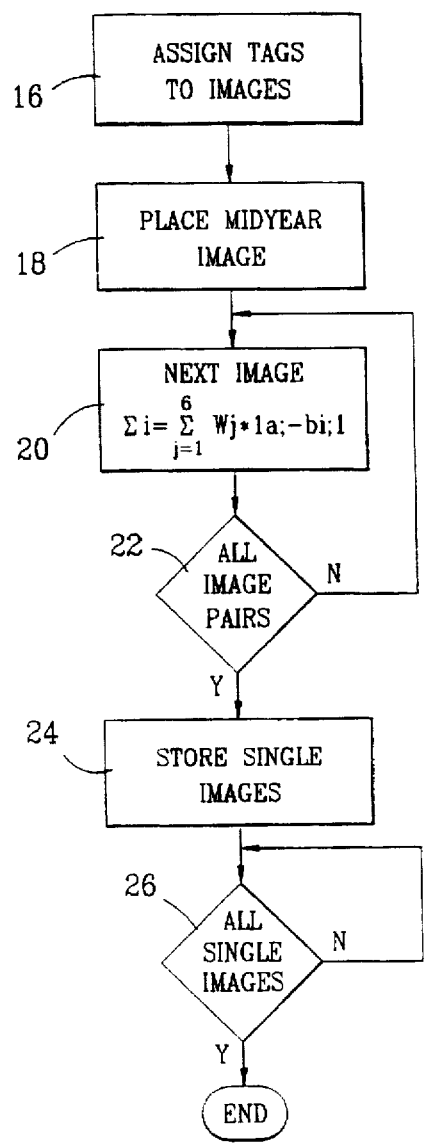

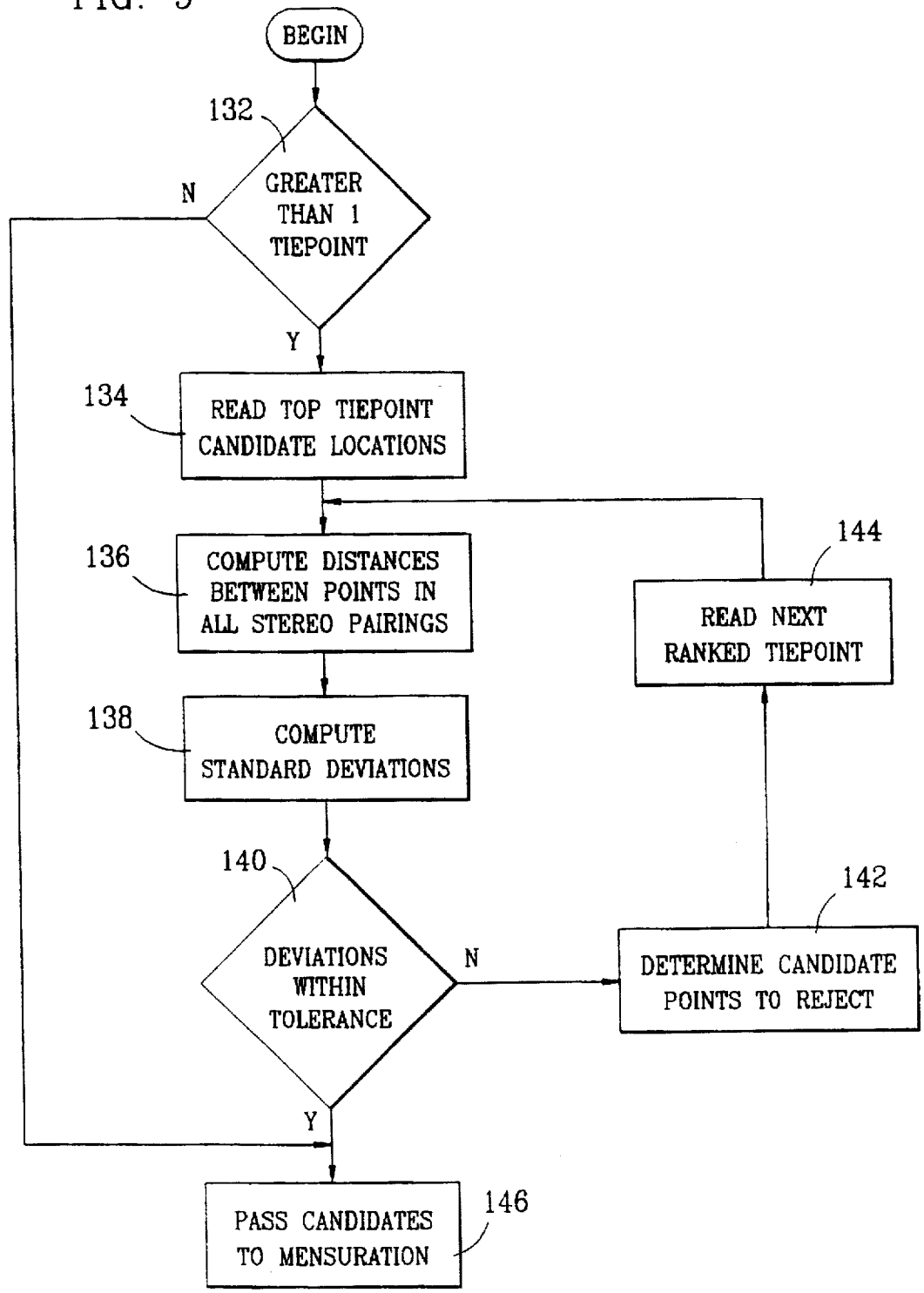

METHOD FOR AUTONOMOUS DETERMINATION OF TIE POINTS IN IMAGERY

This a continuation of application of Ser. No. 08/478, 972, filed Jun. 7, 1995, now U.S. Pat. No. 5,577,181.

TECHNICAL FIELD

The present invention relates no imaging systems, and more particularly to a method for selecting tie points within a sequence of geographically overlapping digital images.

BACKGROUND OF THE INVENTION

Image registration techniques play an important role in terrain assessment and mapping. From a sequence of geographically overlapping digital images, image registration techniques identify and automatically register points of correspondence ("tie points") among the plurality of images. These images are digital images with different orientations and/or scales. These images may also have been obtained at differing times of year and from different geographical perspectives.

Once tie points are identified, coordinates of each corresponding point in each image are calculated so as to be invariant with respect to the scale, orientation and position of the image of which the points are a part. From this information, the areas in common of the overlapping images can be analyzed. It may be desirable to assemble a single large image based on a collection of all of the overlapping points. Thus, a need has arisen to provide a method and apparatus for automatically identifying the same geographical points in different digital images having common coverage in a more versatile and useful fashion.

SUMMARY OF THE INVENTION

The present invention comprises a method and apparatus for selecting the point locations within overlapping images which overcomes The foregoing disadvantages associated with the prior art.

BRIEF DESCRIPTION OF THE DRAWINGS

For a more complete understanding of the present invention and the advantages thereof, reference is now made to the following Detailed Description taken in conjunction with the accompanying Drawings in which:

FIG. 1 is a flow diagram illustrating the process for achieving autonomous tie point registration;

FIG. 2 is a flow diagram illustrating the method for ordering geographically overlapping images;

FIG. 9 is a flow diagram illustrating the method for performing the consensus check function of the present invention.

DETAILED DESCRIPTION

Figure 3:
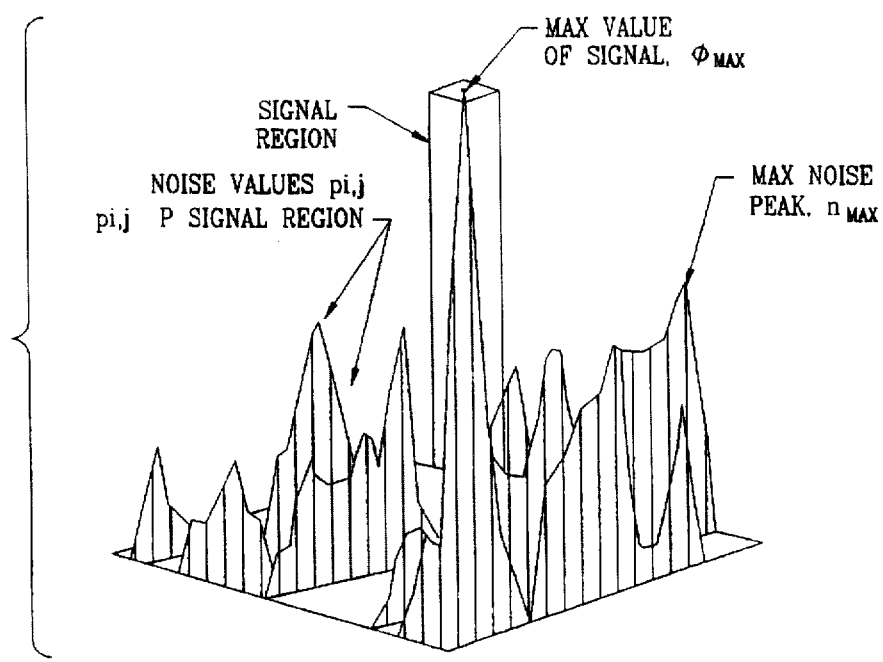
FIG. 3 illustrates the data array resulting from calculating the inverse Fourier transform of an adjacent data array pair.

Referring now to the Drawings, and more particularly to FIG. 1, there is shown a flow diagram of the process for achieving autonomous tie point registration. The process is broken down into the selection process 10 and mensuration process 12. The selection process 10 identifies coarse tie point locations from reduced resolution imagery (generally 1/64×). The mensuration process 12 refines the locations of the rough tie points estimations provided by the selection process 10 to sub pixel array.

The selection process 10 includes optimize stereo pairing 14. The optimize stereo pairing 14 places a plurality of digital images provided by an image gathering apparatus not shown) in a circular order such that all pairings, including the pairing of the first and last images, possess a high degree of likelihood for successful phase correlation. This approach minimizes the differences between the seasons of adjacent images and in the angles defining the taking geometry of adjacent images. The smaller the degree of difference between these two parameters, the greater the possibility of a successful phase correlation between the adjacent images.

Referring now to FIG. 2, there is more fully illustrated the method for ordering the geographically overlapping images according to the present invention. Each image is assigned at step 16 a numerical tag from 1 to N, where N= the total number of images. The ordered images are stored in a two column array M, wherein the total number of rows equals the number of same flight image pairs plus the remaining number of single unpaired images. The first location of array M contains the image closest to midyear. Midyear is defined to be midnight July 1 in the northern hemisphere (including the equator) and as midnight, January 1 in the southern hemisphere. The numerical tags of the same flight image pair occurring closest to the midyear date is stored at step 18 in the first row of array M with the tag of the fore perspective image in Column 1, and the tag of the aft perspective image in Column 2.

For each of the remaining same flight, stereo image pairs, the stereo geometry angles of the image pair most similar to those of the previously stored stereo image pair are calculated, and the tags for the image pair are stored at step 20 in the next row of array M. The stereo image pair containing the most closely associated stereo geometry angles are determined by defining the vector of the last stereo geometry angles placed in the array M as $(a_1, a_2, \ldots a_6)$ and the ith unplaced same flight stereo image pair as $(b_{i1}, b_{i2}, \ldots b_{i6})$. The following equation:

$$\sum_{1}^{6} = \sum_{j=1}^{6} W_j * |a_j - b_{ij}| \qquad (1)$$

is used to determine the index of the same flight stereo image pair minimizing equation (1). Inquiry step 22 continues to the next image pair until all same flight stereo image pairs have been stored within array M.

After inquiry step 22 determines all same flight image pairs having been stored in array M, the single image nearest in time to the image most recently snored in array M is determined at step 24, and the numerical tag of this image is stored in Column 2 of the next row of array M. This procedure continues via inquiry step 26 until the numerical tags of all single images have been stored within array M.

Referring back to FIG. 1, once all images have been ordered by the optimized stereo pairing 14, the phase correlator 21 determines the translational offsets between consecutively ordered images. In order to determine the translational offset between each of the adjacent images, phase correlations are performed between the data arrays describing the images. Adjacent arrays of image data are phase correlated by taking the inverse Fourier Transform of the arrays to compute the phase of the cross power spectrum of the arrays.

This procedure generates a third array, as shown in FIG. 3, that peaks at the desired offset location. The degree of correlation between the two data arrays is measured by correlator Figure of Merit (FOM), defined as the difference between the maximum correlation value in the signal region and the maximum correlation value in the noise region. The peak value of the phase correlation surface is denoted by $\phi_{max}$ and its location is given by ($\Delta l$, $\Delta s$). The noise peak $N_{max}$ is located outside a 5×5 pixel signal region centered at ($\Delta l$, $\Delta s$).

Figure 4:
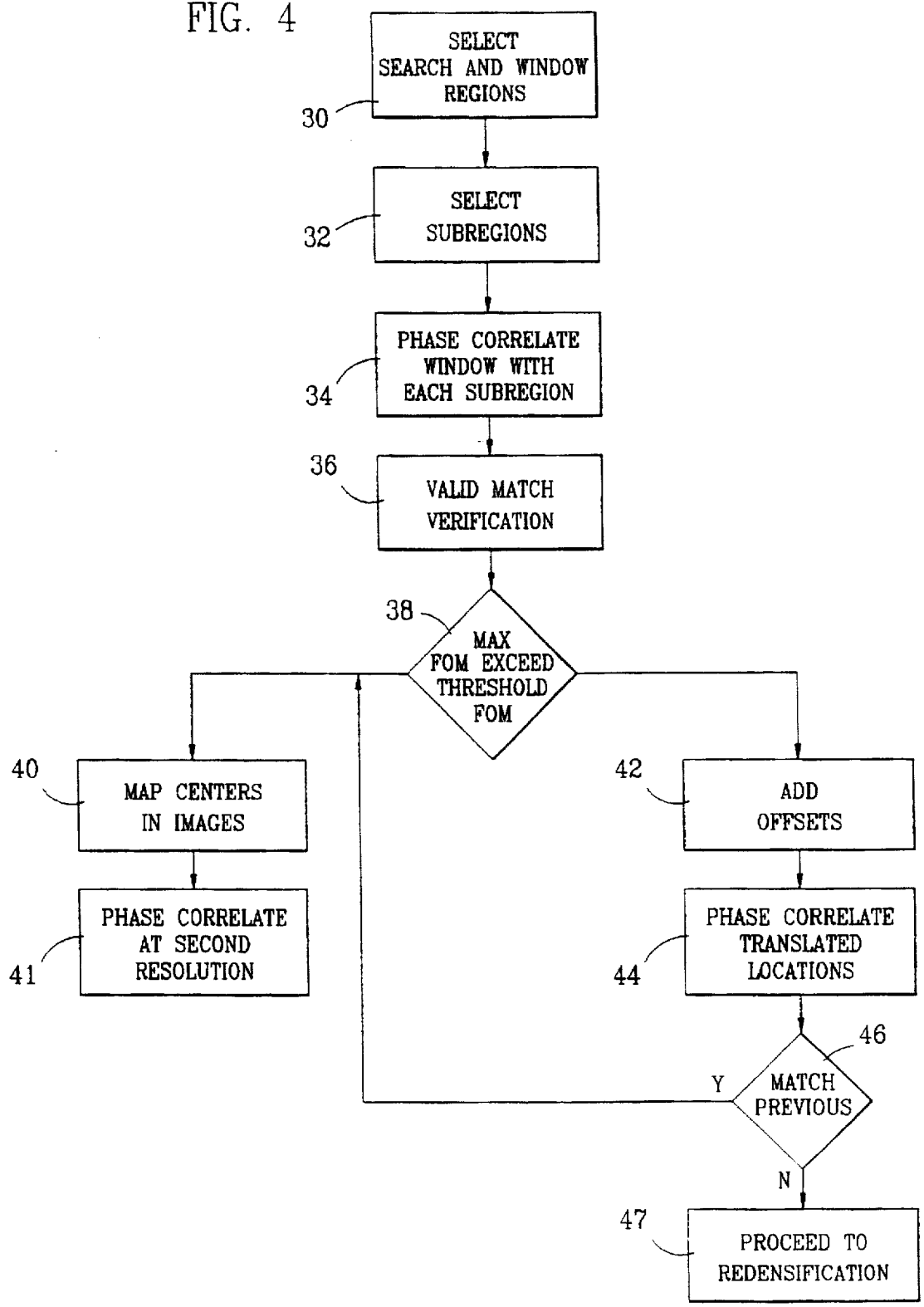
FIG. 4 is a flow diagram illustrating the method for phase correlating image data arrays at a first resolution.

Referring now to FIG. 4, there is shown a flow diagram illustrating the process for phase correlating adjacent image data arrays to determine the translational offset between the images. The process superimposes a pair of images and shifting them against each other without rotation until image features in the overlapping region coincide. Phase correlation is performed twice for each consecutive pairing in the ordering. Each of these phase correlations is performed at a different resolution size. The first resolution size is chosen depending upon the amount of data available in the vicinity of the proposed tie point locations, and the second resolution size is normally ⅛×.

A 64 square pixel window region (W) in the first image and a 128 square pixel search region (S) in the second image are selected at step 30. Within the search region(s), twenty-five (25) overlapping 64 square pixel subregions, identified as candidate match areas, are selected at step 32. The candidate match areas lag each other by 16 pixels in each dimension. Phase correlation is performed at step 34 between the first image window and each of the candidate match areas. For each correlation, a feature vector is stored. The feature vector consist of ($\phi_{max}$, $N_{max}$, FOM, ($\Delta l$, $\Delta s$)). Also recorded are the index of the candidate match area having the maximum FOM, as well as the index of the candidate match area having the maximum value of $\phi_{max}$.

Once each candidate match area within the search region (S) has been phase correlated with the window (W), an additional phase correlation, the Valid Match Verification VMV), is performed at step 36. The VMV adds the offsets ($\Delta l$, $\Delta s$) obtained from correlating (W) with each of the candidate match areas to the location of each candidate match area and phase correlates (W) with the translated candidate match areas. The feature vector ($\phi_{max}$, $N_{max}$, FOM, $\Delta l$, $\Delta s$)) for these additional correlations is also stored.

Figure 5:
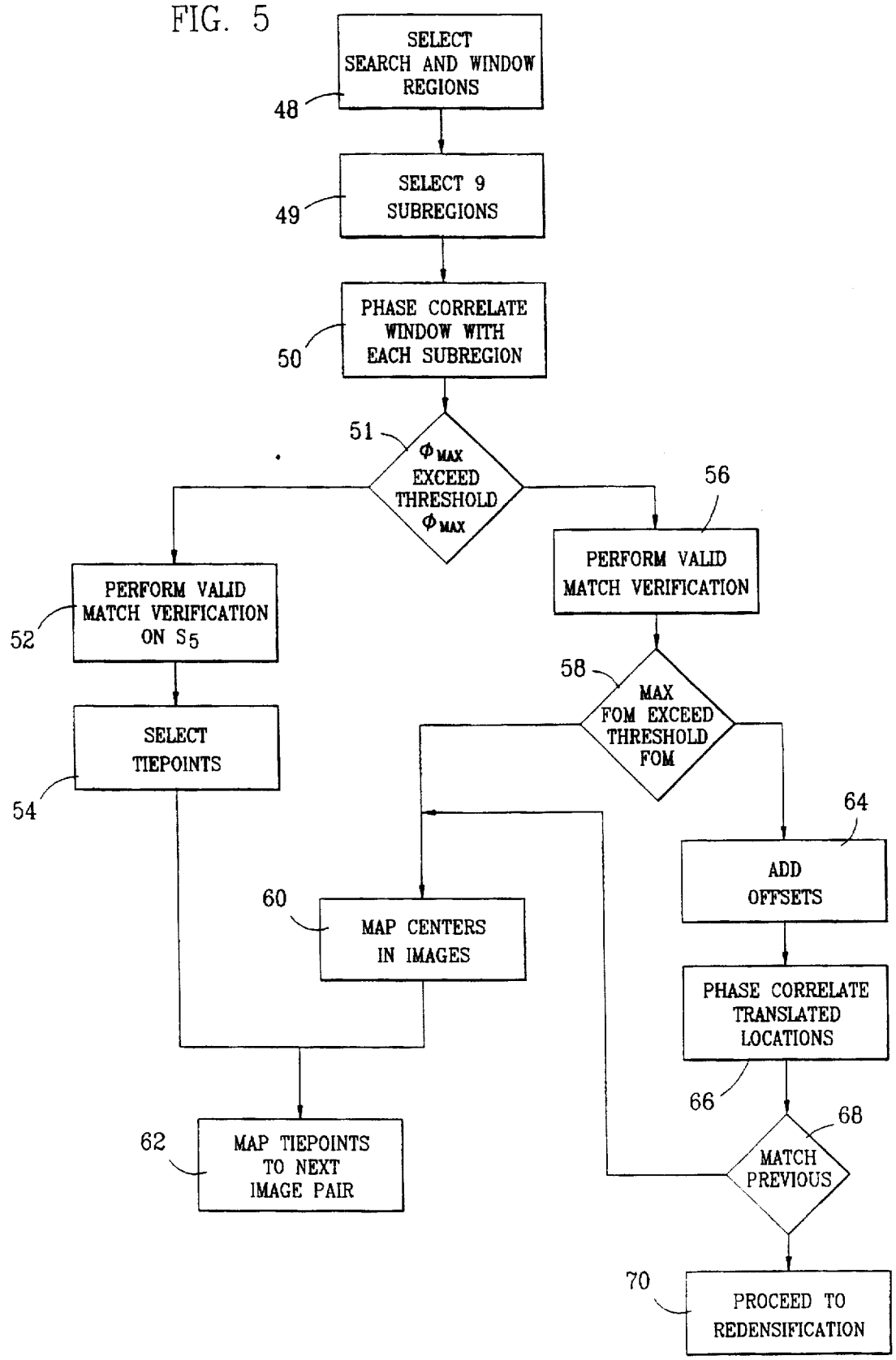
FIG. 5 is a flow diagram illustrating the method for phase correlating image data arrays at a second resolution.

If the maximum FOM from the VMV exceeds at inquiry step 38 threshold FOM value, phase correlation is considered successful. Thus, at step 40, the center of window (W) is mapped to the center of the 64 square pixel array of the first image and the center of the best matching candidate match area is mapped to the center of a 96 square pixel array in the second image at a point (S*) defined by the following equation:

$$S^* = S + (\Delta l, \Delta s)_i + (\Delta l, \Delta s)_v \qquad (2)$$

wherein:

($\Delta l$, $\Delta s$)$_i$=initial candidate match offset ($\Delta l$, $\Delta s$)$_v$=VMV offset Phase correlation is performed at step 41 at the second resolution according to the procedure illustrated in FIG. 5.

If the maximum Figure of Merit value does not exceed the threshold Figure of Merit value at inquiry step 38, the translational offsets of all twenty-five (25) candidate match areas are added at step 42 to their respective locations, and the translated candidate match areas are phase correlated at step 44. If any of the candidate match areas predict the same match location (±2 pixels in each dimension separately) as the previous phase correlation predicted at inquiry step 46, this candidate is deemed to successfully match the window in the first image. The 64 square pixel first image window is centered at the initial window location at step 40, and the 96 square pixel search region is centered an the point (S*) corresponding to:

$$S^* = S + (\Delta l, \Delta s)_i \qquad (3)$$

Phase correlation proceeds at step 41 according to the process outlined in FIG. 5. If none of the candidate match areas predict the same location at step 46, correlation is deemed to have failed and new tie point locations must be proposed by the redensification function at step 47.

Referring now to FIG. 5, there is illustrated the method for processing candidate tie points at the second resolution. A 64 square pixel window region (W) in the first image and a 96 square pixel search region (S) in the second image are selected and centered at step 48 at respective proposed tie point locations from the process described in FIG. 4. Within the search regions, nine (9) overlapping candidate match areas (subregions) are selected at step 49. These candidate match areas lag each other by 16 pixels in each dimension. The window is phase correlated at step 50 with each of the candidate match areas. For each correlation, a feature vector is stored as described previously with respect to FIG. 4. Also recorded are the index of the candidate with the largest FOM, the index of the candidate with the largest $\phi_{max}$, and the value of $\phi_{max}$ for the central candidate match area ($S_5$).

Inquiry step 51 determines if $\phi_{max}$ of the central candidate match area exceeds a maximum threshold value. If so, a valid match verification is performed at step 52 on $S_5$, and the tie points for the current image pair are selected at step 54 at the center of W for the left image, and at $S_5+(\Delta l, \Delta s)_5+(\Delta l, \Delta s)_v$ for the right image. If $\phi_{max}$ of the central candidate match area does not exceed the predetermined maximum threshold value for $\phi_{max}$, a valid match verification procedure, as described previously with respect to FIG. 4, is executed at step 56.

If the maximum Figure of Merit from the VMV exceeds the threshold FOM value at inquiry step 58, phase correlation is considered successful. Thus, at step 60, the center of window (W) is mapped to the center of the 64×64 pixel array of the first image and the center of the best matching candidate area is mapped to the center of a 96×96 pixel array in the second image. If the maximum Figure of Merit value from the VMV process at step 56 does not exceed the threshold Figure of Merit value at inquiry step 58, the translation offsets of all twenty-five (25) candidate match areas are added at step 64 to their respective locations, and the translated candidate match areas are phase correlated at step 66.

If any of the candidate match areas predict the same match location (±2 pixels in each dimension separately) as the previous phase correlation predicted at inquiry step 68, this candidate is deemed to successfully match the window in the first image and the 64 square pixel first image window is centered at the initial window location at step 60, while the 96 square pixel search region is centered an the point (S*) corresponding to:

$$S^* = S + (\Delta l, \Delta s)_i \qquad (3)$$

If none of the candidate match areas predict the same location at step 68, correlation is deemed to have failed and new tie point locations must be proposed by redensification 71.

Once an image pairing has been successfully phase correlated proposed tie point location exists in the right hand image of the pairing. Coordinates for this tie point location are given in a plane. To move to the next pairing, this tie point location is mapped to rectified (x, t) space using the appropriate coefficients for image rectification, and the point is then mapped to (r, s) space of the next pairing using a different set of coefficients at step 62. This yields a new tie point location in the left hand image of the next pairing that forms the center of the new window W.

Referring back to FIG. 1, the candidate area assessment 53 provides an assessment of signal level and scene content correlation for candidate areas within the first image. The signal level and scene content correlation are calculated at sixteen (16) test point locations within each candidate area. By analyzing the signal level and scene content correlation, test point locations to be used in finding tie point locations within the remaining images are generated.

Figure 6:
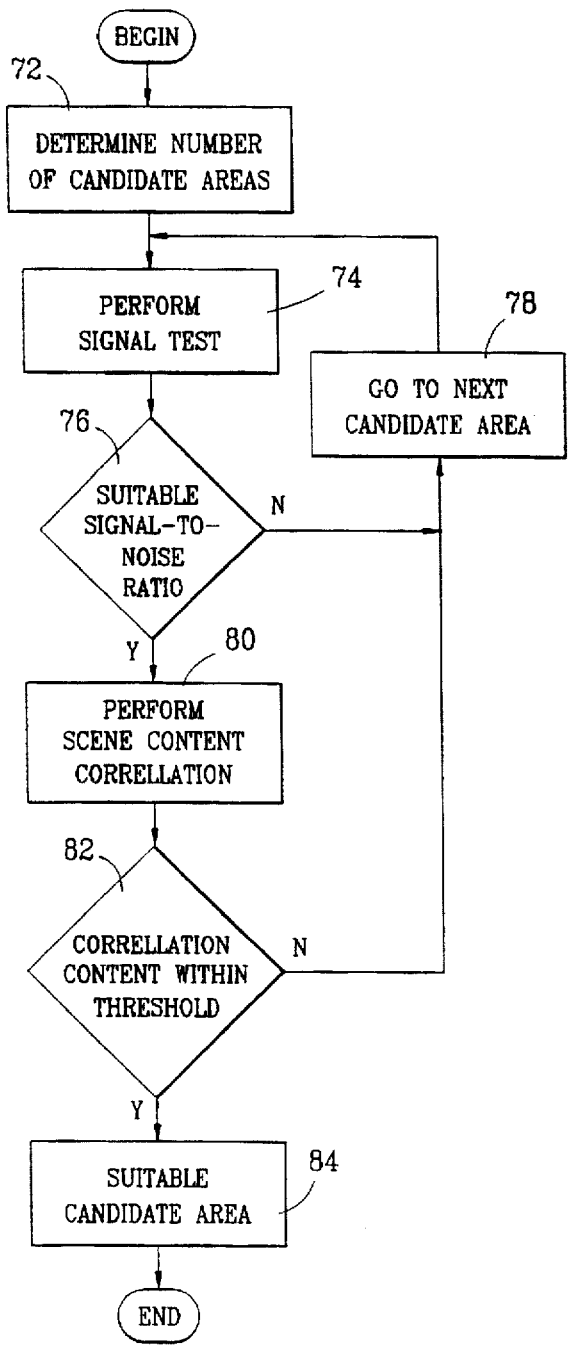
FIG. 6 is a flow diagram illustrating the method for assessing potential tie point locations.

Referring now to FIG. 6, there is more fully illustrated the method for assessing candidate areas. The number of candidate areas within the first image are determined at step 72 and 16 test point locations are selected within each candidate area of the first image. A signal level test is performed at step 74 on the test points within each candidate area. The signal level test determines the standard deviation of signal strength within a 7×15 pixel array centered about each test point location. It is to be understood that the size of the pixel array surrounding the test point locations in the signal level tests may be of a variety of dimensions selected by a user. The calculated standard deviation is compared to a predetermined threshold level. If eleven (11) of the standard deviations computed for the 16 test point locations are less than the threshold level as determine by inquiry step 76, the candidate area is considered non-suitable due to a weak signal-to-noise ratio and processing proceeds to the next candidate area at step 78.

If inquiry step 76 determines a candidate area contains sufficient signal to noise ratio, the scene content correlation is calculated at step 60 for the candidate area. For each test point location within a candidate area, a 7×15 pixel window centered about a given test point is phase correlated with four (4) different 7×15 windows, whose window centers are displaced some by distance ($\tau$) with respect to the test point center. Locations of the four (4) window midpoints are at (l, s−$\tau$), (l, s+$\tau$), (l−$\tau$,s) and (l+$\tau$, s). The correlation procedure provides four (4) autocorrelation estimates $P_1$, $p_2$, $p_3$, and $p_4$. Estimates of correlation content for a lag $\tau$ are made for the sample (s) and line (l) directions according no the following equations:

$$p_s = \frac{p_1 - p_2}{2} \quad (4)$$

$$p_l = \frac{p_3 + p_4}{2} \quad (5)$$

If inquiry step 82 determines the correlation content for the line and sample directions does not lie within a predetermined threshold range, the candidate area is considered unsuitable and processing proceeds to the next Candidate area via step 78. Otherwise, the candidate areas are identified an step 84 as suitable candidates for the normalized cross correlation function.

Referring again to FIG. 1, the candidate tie points determined from the candidate area assessment 53 are forwarded to normalized cross correlation (NCC) 90. Candidate tie point locations in the left hand image of the first stereo pair are assigned as designated by the CAA function. The NCC 90 attempts to find conjugate pairs in the right hand image. The maximum correlator values contained in the NCC solution array is chosen as a conjugate tie point location.

A FOM zest is applied to the selected conjugate tie point locations as an additional check on validity. Points that fail the FOM test are dropped from further processing. Points that pass the FOM test are mapped to the left hand image of the next stereo pair which has been specified by the optimized image pairing 14. The entire NCC process is repeated on each stereo pair. Candidate tie points that pass all of the FOM tests (one (1) per stereo pair) are mapped back to the original image, and a closure test network 110 locates blunders and false matches.

Figure 7:
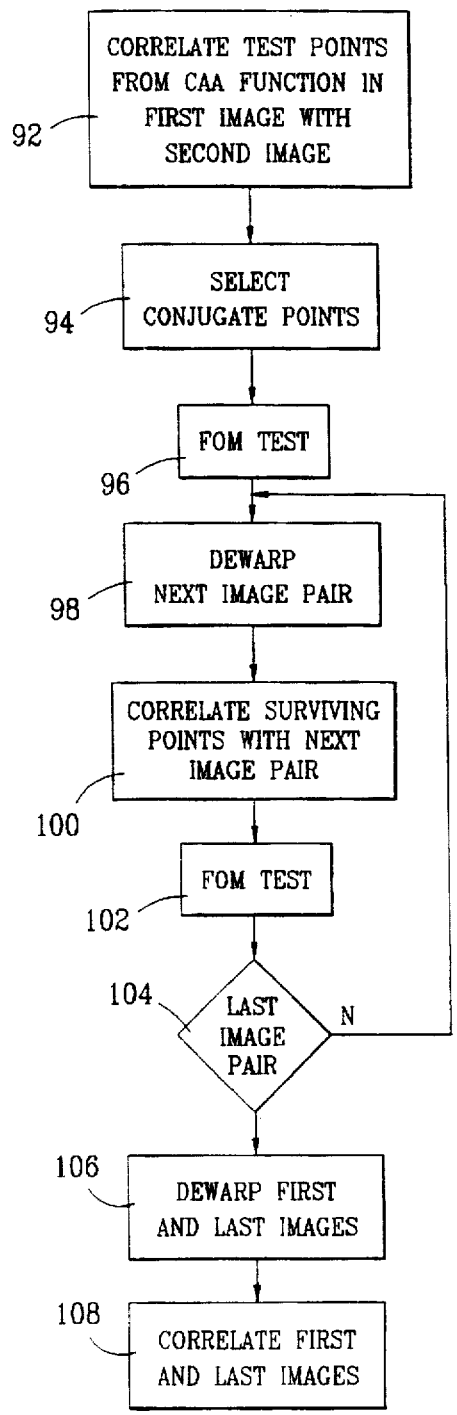
FIG. 7 is a flow diagram illustrating the normalized cross correlation method of the present invention.

Referring now to FIG. 7, there is illustrated in more detail the method for accomplishing the normalized cross correlation of the normalized cross correlation function. Candidate tie point locations in the first image received from the CAA network 53 are correlated an step 92 with the second image, and the maximum correlation values are selected as conjugate points within the second image at step 94. Once the maximum correlation value is determined, the Figure of Merit (FOM) for the image correlation is determined according to the following equation:

$$FOM = p_{max} * \frac{p_{max}}{\eta_{max}} * PGF \quad (6)$$

$$= p_{max} * RATIO * PGF$$

where $p_{max}$ and $\eta_{max}$ are defined in FIG. 3 and PGF is computed by the following:

where $P_{max}$ and $N_{max}$ are defined in FIG. 3 and PGF is computed by the following:

$$PGF = 10^X$$

where $X = \log_{10}\left[ 1/2 \left( 1 + erf\left\{ \frac{\hat{P}_{max} - \hat{\mu}_{noise}}{\hat{\sigma}_{noise}} \right\} \right) \right] N^*$ $$\hat{P}_{max} = 1/2 \left( \log_e \left[ \frac{1 + P_{max}}{1 - P_{max}} \right] \right)$$

$$\hat{\mu}_{noise} = 1/2N \sum_{ij} \log_e \left( \frac{1 + P_{ij}}{1 - P_{ij}} \right)$$

$$\hat{\sigma}_{noise} = \left[ 1/N \sum_{ij} \left( 1/2 \log_e \left[ \frac{1 + P_{ij}}{1 - P_{ij}} \right] \right)^2 - \hat{\mu}^2_{noise} \right]^{1/2}$$

and N is the total number of $P_{ij}$ values generated in the correlation process. The FOM value is compared to a threshold FOM value and any candidate locations not exceeding a threshold FOM value are dropped as candidate locations at step 96.

A stereo image pair comprised of the second image of the previous image pair and the following image are dewarped as a stereo pair at step 98. The candidate points surviving the FOM test from the previous normalized cross correlation process are again correlated for the next image pair at step 100. Points passing the FOM zest for this correlation are determined at step 102, and the points are forwarded for dewarping and correlation if inquiry step 104 verifies the existence of additional image pairs. Once all image pairs have been correlated, the last and first images are dewarped as a stereo pair at step 106, and the images are correlated at step 108. Candidate matches passing the FOM threshold requirements throughout the process are forwarded for further analysis.

The preceding discussion of the normalized cross correlation procedure assumes there will be successful correlations in each image. If, for any reason, this does not occur, normalized cross correlation processing will terminate for those images, and control passes to the redensificantion 71. If all alternate tolerance regions are exhausted, and no candidate tie points are found, the procedure reverts to interactive selection of the tie point candidates.

Referring again to FIG. 1, the closure test 110 performs a deterministic test arising from the concept that a single point, when correlated and mapped through all images of interest with zero (0) errors, will have the same computed coordinate value that was assigned to it at the beginning of NCC processing. Therefore, the difference between its initial assigned coordinate and its final mapped value at the end of closure test processing will be zero (0). There is some residual error after closure test processing for valid candidate tie points. A tolerance threshold of ±2 pixels has been established. Points having closure errors greater than this magnitude are considered blunders and are not retained for further processing.

Once normalized cross correlation 90 has generated the plurality of candidate tie point locations, the closure test 110 maps the location of the candidate tie points in the last image from (r, s) coordinates to (x, t) coordinates and then back to (r, s) coordinates in the left hand image of the first stereo pair. The mapped candidate tie points are compared to the original position of the tie points and any pixels differing by more than two (pixels) are discarded. The two pixel variations are incorporated to account for correlating and mapping errors caused by the normalization cross correlation procedure.

The candidate tie point ranking 112 receives the information vector of candidate tie points having passed the closure zest 110. The candidate tie point ranking 112 selects three (3) candidate tie points having the highest probability of successfully passing normalized cross correlation and closure test procedures during the mensuration process 12 based upon data contained within the information vectors of the candidate points.

Figure 8:
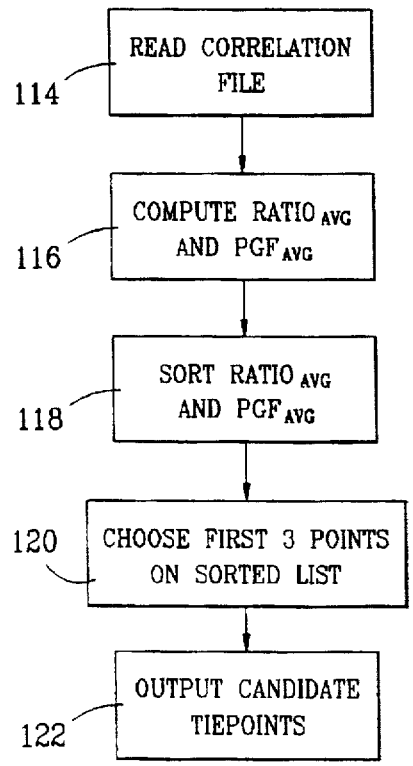
FIG. 8 is a flow diagram illustrating the method for ranking candidate tie point locations.

Referring now to FIG. 8, there is illustrated the method for ranking candidate tie point locations according to the candidate tie point ranking 112. All candidate tie points are read at step 114 from the correlation file generated by the normalized cross correlation and closure tests 90, 110. For each candidate tie point, the averages of RATIO and PGF are computed at step 116. The averages for RATIO and PGF form a mean information vector ($\vec{V}_m$) for each candidate tie point location, as illustrated by the following equation:

$$\vec{V}_m = \frac{1}{4} \sum_{n=1}^{4} RATIO_i$$
$$\frac{1}{4} \sum_{i=1}^{4} PGF_i$$

The RATIO and PGF averages are sorted at step 118 in descending order. The candidate tie point ranking 112 selects at step 120 the first three (3) candidate tie points according to the sorted RATIO average list. While the present description describes sorting the candidate tie points according to the RATIO average of the candidate tie points, the candidate tie points may also be sorted according to the PGF parameter as selected by a user. Finally, the top three (3) candidate tie points from the sorted lists are output at step 122 for further processing.

Referring back to FIG. 1, once all candidate tie points are ranked by the candidate tie point ranking 112, the points are passed to the consensus check 130. The consensus check 130 selects the top two (2) or three (3) tie point locations from the ranked candidates and calculates the distance between the points in three dimensional object space for each stereo pairing.

The triangle formed in three dimensional object space by three (3) candidate tie point locations should be congruent in all pairings. Candidate tie points passing these criteria minimizes the possibility of false match locations with any of the three (3) points. To calculate the distances between the candidate tie points forming the triangles, the consensus check 130 processes the ranked candidate tie points and direction cosines in all stereo pairings of interest. In the event that only one tie point candidate location exists, the consensus check 130 is bypassed, and the point is passed to the mensuration process 12.

Referring now to FIG. 9, there is more fully illustrated the method by which the consensus check 130 performs the analysis of the ranked candidate tie points. At inquiry step 132, a determination is made of the existence of more than one (1) tie point candidate location. If only one (1) candidate tie point exists, processing passes to step 146 to pass the candidate tie point to the mensuration process 12. If more than one (1) tie point candidate exists, the top candidate locations, normally two (2) or three (3), are read at step 134, and the distances between these points in all stereo pairings are calculated at step 136. Utilizing the distances computed at step 136, the standard deviation of distances between particular tie point candidates in the stereo pairs are determined at step 138. These standard deviations are compared at step 140 to a predetermined tolerance range, and if all deviations exists within the specified tolerance range, the top two (2) or three (3) candidates are passed to mensuration at step 146.

If one or more of the standard deviations are not within the specified tolerance range, the candidate point to be rejected is determined at step 142, and the next ranked candidate tie point is selected at step 144. The determination of candidate tie points for rejection at step 142 will be more fully discussed. Once a new tie point location is selected at step 144, control returns to step 136 and the distances and standard deviations between the new candidate tie point locations are again determined.

If any of the standard deviations do not fall within one of the predetermined tolerance ranges one of the following three (3) procedure will be followed at step 142.

CASE 1:

One standard deviation is greater than a tolerance level; and a) the other two standard deviations are not equal; or
 Procedure:
  The common tie point of the two distances with the largest standard deviation is rejected.
b) the other two standard deviations are equal.
 Procedure:
  The lower ranked tie point of the tie points comprising the distances in question is rejected.

CASE 2:

Two standard deviations are greater than a tolerance level.
 Procedure:
  The common tie point of the two distances is rejected.

CASE 3:

All three standard deviations are greater than tolerance; and a) all three standard deviations are unequal; or
 Procedure:

The common tie point of the two largest standard deviations is rejected.

b) two standard deviations are equal and the third standard deviation is greater; or Procedure:
The lower ranked tie point of the segment comprising the largest standard deviation is rejected.

c) two standard deviations are equal and the third standard deviation is less; or Procedure:
The common tie point of the two largest standard deviations is rejected.

d) all three standard deviations are equal.

Procedure:
The common tie point of the two lowest ranked tie points is rejected.

Referring back to FIG. 1, the redensification 71 provides the logic required to redensify an alternate location for a tolerance region when a candidate tie point location cannot be found in the primary tolerance region. The first time redensification 71 is utilized for determining an initial or primary tolerance region, alternate locations of tolerance region on either side of the primary region are computed. These alternate locations of tolerance regions are utilized when there is a failure to find candidate tie point locations at any point within the selection procedure 10.

After completion of the selection procedure 10, the surviving candidate tie points (normally 3) are forwarded to the mensuration process 12. The mensuration process 12 provides many of the same functional processes as the selection process 10 but performs the procedures at full resolution. Normalized cross correlation 150 utilizes the normalized crossed correlation procedure discussed previously with respect to FIG. 7. However, there are a few notable differences between the two procedures. The FOM test of step 96 applied to the correlated peak values during the selection process 10 is not performed for the normalized cross correlation 150 of the mensuration process 12. All correlator peak locations are accepted as valid and the closure test 152 is used to determine which locations are kept as candidate points. Also, image data used to fill 7×15 Windows are sampled four (4) or more pixels apart in both the left and right images. Finally, the normalized cross correlation procedure is carried out at full resolution as opposed to one quarter resolution.

After the normalized cross correlation 150 analyses, the surviving candidate tie points are forwarded at full resolution to a closure test 152. The closure test 152 analyzes and forwards tie point candidate locations passing the closure test in the same manner as that discussed with respect to the closure test 100 of the selection process 10.

Once normalized cross correlation 150 and closure test 152 have processed the candidate tie points, any surviving tie point candidates are processed by tie point accuracy 154 to estimate the accuracy of the tie point candidates. Tie point accuracy 154 refines the candidate tie point locations to decimal line and sample (sub-pixel) accuracy and determines the error associated with tie point candidate location estimate. Initial integer tie point locations are refined by fitting a quadratic surface to a 3×3 window extracted from the normalized cross correlation solution array and determining the surface fit maximum needed to refine the tie point integer location to sub-pixel accuracy.

Figure 10:
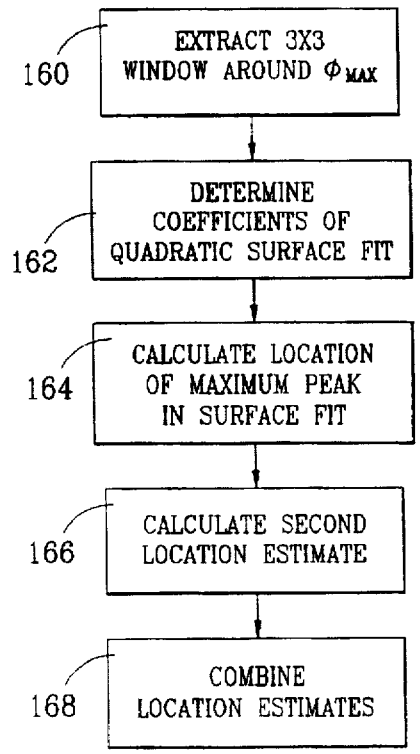
FIG. 10 is a flow diagram illustrating the method for fitting a quadratic surface to a 3×3 pixel window extracted from a normalized cross correlation solution array.

Referring now to FIG. 10, there is illustrated the method for fitting the quadratic surface to a 3×3 pixel window extracted from the normalized cross correlation solution array. The 3×3 pixel window centered about the maximum value of the cross correlation array is extracted at step 160 from the array. The coefficients of a quadratic surface satisfying the least squares constraint on the nine (9) points included in the extracted 3×3 array are determined at step 162 for the following quadratic equation:

$$Z = a_0 + a_1 X + a_2 y + a_3 x^2 + a_4 y^2 + a_5 XY \tag{8}$$

The surface coefficients for the quadratic surface are determined according to the following equations:

$$a_0 = (5CON1 - 3(CON4 + CON5))/9$$

$$a_1 = CON2/6$$

$$a_2 = CON3/6$$

$$a_3 = CON4/2 - CON1/3$$

$$a_4 = CON5/2 - CON1/3$$

$$a_5 = CON6/4$$

Where:

$$CON1 = \sum_{i=1}^{1} \sum_{j=1}^{1} P_{ij}$$

$$CON2 = \sum_{j=-1}^{1} (P_{ij} - P_{ij})$$

$$CON3 = \sum_{i=-1}^{1} (P_{i1} - P_{i-1})$$

$$CON4 = \sum_{j=-1}^{1} (P_{ij} + P_{ij})$$

$$CON5 = \sum_{i=-1}^{1} (P_{i1} + P_{i-1})$$

$$CON6 = (P_{-1-1} - P_{11}) - (P_{1-1} + P_{-11})$$

and the $P_{ij}$ value indicates the maximum value produced by the correlation process. The remaining $P_{ik}$ values ($l \ne i$, $k \ne j$) denote a 3×3 window of correlation values having as the midpoint and maximum value.

Finally, the coordinates (x,y) of the peak of the quadratic surface are found at step 154 according to the equation:

If $a_3 < 0$, then \hfill (9)

$$(x,y) = \left( \frac{a_2 a_5 - 2a_1 a_4}{H}, \frac{a_1 a_5 - 2a_2 a_3}{H} \right)$$

where:

$$H = 4a_3 a_4 - a_5$$

Under any other conditions for $a_3$ and H, the location of the peak value for the quadratic surface fit defaults to the center of the window such that (x,y)=(0,0).

A second estimate of the integer tie point location is calculated an step 166 and the two (2) estimates are combined at step 168 to provide a final sub-pixel tie point location estimate. Generation of the second estimate is based upon the assumption that autocorrelation values of the 7×15 pixel window and the direction of a line (L) containing the integer tie point and first sub-pixel estimate diminish according to an exponential function given by:

$$\phi XX = e^{-\alpha \tau} \tag{10}$$

The fall off rate $\alpha$ is computed by locating the integer lag (N1 for N1 $\le$ 5) along line (L) whose autocorrelation value p is the smallest of the positive autocorrelation values. Upon this bases, α is computed be −ln (p)/N1. This autocorrelation model is designed to fit exactly the autocorrelation values along line p computed at lags 0 and N1. The second subpixel estimate is then given simply by the lag value along (L) for which the model assumes the value of $\phi_{max}$ (the peak value normalized cross correlation function) given as:

$$\hat{\tau} = \frac{N1}{\ln(p)} * \ln(\phi_{max}) \quad (11)$$

Previous locations of tie points to sub-pixel accuracy using simulated stereo imagery has indicated accuracies to generally no less than 0.2 pixel (line and sample) for either the surface fit estimation on the expeditial correlation model described in equation 10. It appears that general scene content may be adequately modeled by a process generally providing results somewhere between the two models discussed. For this reason, the final tie point estimation $P_{TP}$ is determined by combining results from the two estimates at step 64.

Although a preferred of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

We claim:

1. A method for selecting tie points within a sequence of overlapping digital images, comprising the steps of:
   identifying tie point locations from the sequence of overlapping digital images by phase correlation at a reduced resolution; and
   refining the identified tie point locations to sub-pixel accuracy by normalized cross correlation at full resolution to select the tie points within the sequence of overlapping digital images.

2. The method of claim 1 wherein the step of identifying tie point locations further includes the steps of:
   ordering the sequence of overlapping digital images to maximize the number of successful phase correlations between adjacent image pairs;
   calculating translational offsets between the adjacent image pairs;
   assessing suitability of overlapping areas for normalized cross correlation; and
   determining the tie point locations by normalized cross correlation at a reduced resolution.

3. The method of claim 2 wherein the step of identifying tie point locations further includes the steps of:
   testing for a closure to discard the tie point locations that exceed a predetermined tolerance value; and
   ranking the tie point locations remaining from the closure to maximize the probability of selecting tie points during the step of refining the identified tie point locations.

4. The method of claim 3 wherein the step of ranking the tie point locations further includes the step of calculating distances between the tie point locations to consensus check in three dimensional object space.

5. The method of claim 1 wherein the step of refining the identified tie point locations further includes the steps of:
   testing for a closure to discard the tie point locations that exceed a predetermined tolerance value; and
   estimating an accuracy of the tie point locations remaining from the closure to determine errors thereby enabling further refining the tie point locations to sub-pixel accuracy.

6. A method for selecting tie points within a sequence of overlapping digital images, comprising the steps of:
   identifying tie point locations from the sequence of overlapping digital images by phase correlation at a reduced resolution, the step of identifying further comprising the steps of:
      ordering the sequence of overlapping digital images to maximize the number of successful phase correlations between adjacent image pairs;
      calculating translational offsets between the adjacent image pairs;
      determining suitability of overlapping areas for normalized cross correlation;
      determining the tie point locations by normalized cross correlation;
      testing for a closure to discard the tie point locations that exceed a predetermined tolerance value; and
   refining the identified tie point locations to sub-pixel accuracy by normalized cross correlation at full resolution, the step of refining further comprising the steps of:
      conducting the closure test to discard the tie point locations that exceed a predetermined tolerance value; and
      estimating an accuracy of the tie point locations remaining from the closure to determine error associated with the step of estimating to further refine the tie point locations to sub-pixel accuracy.

* * * * *

UNITED STATES PATENT AND TRADEMARK OFFICE
CERTIFICATE OF CORRECTION

PATENT NO. : 5,724,496
DATED : March 3, 1998
INVENTOR(S) : Givens, et al.

It is certified that error appears in the above-identified patent and that said Letters Patent is hereby corrected as shown below:

Column 1, line 9, after "relates" delete "no", and insert -- to --;

Column 1, line 40, after "overcomes", delete "The", and inert -- the --.

Column 2, line 16, after "apparatus", insert -- ( --;

Column 2, line 51, delete "$\sum_1$", and insert -- $\sum_i$ --;

Column 2, line 61, after "recently", delete "snored" and insert -- stored --.

Column 4, line 12, after "centered", delete "an" and insert -- at --.

Column 5, line 6, after "correlated", and insert -- , a --;

Column 5, line 55, delete $P_s = \dfrac{P_1 - P_2}{2}$, and insert -- $P_s = \dfrac{P_1 + P_2}{2}$ --;

Column 5, line 62, after "next", delete Candidate", and insert -- candidate --;

Column 5, line 64, after "fied", delete "an", and insert -- at --.

Column 6, line 7, after "FOM", delete "zest", and insert -- test --;

Column 6, line 59, after "FOM", delete "zest", and insert -- test --.

UNITED STATES PATENT AND TRADEMARK OFFICE
CERTIFICATE OF CORRECTION

PATENT NO. : 5,724,496
DATED : March 3, 1998
INVENTOR(S) : Givens, et al.

It is certified that error appears in the above-identified patent and that said Letters Patent is hereby corrected as shown below:

Column 7, line 33, after "closure", delete "zest", and insert -- test --.

Column 10, line 39, after "having", insert -- $P_{ij}$ --;

Column 10, line 56, after "calculated", delete "an", and insert -- at --.

Column 11, line 13, after "generally", delete "no", and insert -- be --.

Signed and Sealed this

Sixteenth Day of June, 1998

BRUCE LEHMAN

*Attest:*

*Attesting Officer*      *Commissioner of Patents and Trademarks*